United States Patent [19]

Syun-ichi et al.

[11] 3,984,008
[45] Oct. 5, 1976

[54] APPARATUS FOR AUTOMATIZING FLAW DETECTION

[75] Inventors: Nishizawa Syun-ichi, Nagaokakyo; Tsubota Toshio; Igarashi Taenzi, both of Kyoto, all of Japan

[73] Assignee: Mitsubishi Jukogyo Kabushiki Kaisha, Japan

[22] Filed: July 8, 1975

[21] Appl. No.: 594,065

[30] Foreign Application Priority Data

July 15, 1974 Japan.............................. 49-80923

[52] U.S. Cl. .......................... 214/1 BB; 214/1 CM; 165/76; 294/85; 114/222
[51] Int. Cl.² ......................... B25J 9/00; F28F 7/00
[58] Field of Search .............. 214/1 BB, 1 CM, 1 B; 165/76; 74/22 A, 22 R, 23; 294/85; 114/222

[56] References Cited
UNITED STATES PATENTS

| | | | |
|---|---|---|---|
| 2,136,255 | 11/1938 | Scanlon | 294/85 X |
| 3,811,320 | 5/1974 | Cowell | 114/222 X |
| 3,889,820 | 6/1975 | Ranger | 165/76 X |
| 3,913,452 | 10/1975 | Ward et al. | 114/222 X |
| 3,913,752 | 10/1975 | Ward et al. | 214/1 BB |

*Primary Examiner*—Robert S. Ward, Jr.
*Attorney, Agent, or Firm*—McGlew and Tuttle

[57] ABSTRACT

An apparatus for automatizing flaw detection comprising carrier bodies arranged in parallel, on sides (Y—) and (Y,+), taps capable of supporting the both bodies and extensible from and retractable into the bodies, clamp shafts having downwardly tapered heads and vertically movably inserted in hollow shafts of the taps, and collet claws disposed around the portions of the clamp shafts near their heads, with expansion bands fitted around the claws for centripetally fastening them together, the carrier body on the (Y—) side being slidably supported by X-direction guide rods and the carrier body on the (Y,+) side by the X-direction guide rods and Y-direction guide rods.

5 Claims, 4 Drawing Figures

APPARATUS FOR AUTOMATIZING FLAW DETECTION

This invention relates to an apparatus for automatizing the inspection and flaw detection of holes in structures and the like. More particularly, the invention is concerned with an apparatus for automatizing the test equipment for steam generators and the like, for example, by bringing primary detecting means into contact with the open ends of small steam pipes of a ceiling pipe plate in a water chamber communicated with the small steam pipes of the steam converter in an atomic power plant, and automatically changing the position of the apparatus while the open ends are being inspected in succession for flaw detection.

Heretofore, no developmental attempt has been reported on an apparatus which itself clings to a ceiling or vertical wall and shifts its position by built-in drives without any support from below. The present invention has now realized such a concept.

It is a principal object of this invention to provide an apparatus for automatizing flaw detection characterized by carrier bodies arranged in parallel on two sides (Y,−) and (Y,+), which designate the directions (as illustrated in FIGS. 1 and 2) in which the apparatus travels, taps capable of supporting the weights of the carrier bodies and movable out of and into the bodies, guide rods slidably supporting the carrier body on the (Y,−) side in the X-direction, and guide rods slidably supporting the (Y,+) side carrier body in the Y direction as well as in the X-direction.

The above and other objects and advantages of the present invention will become more apparent from the following description taken in conjunction with the accompanying drawings, wherein.

Figure 1:
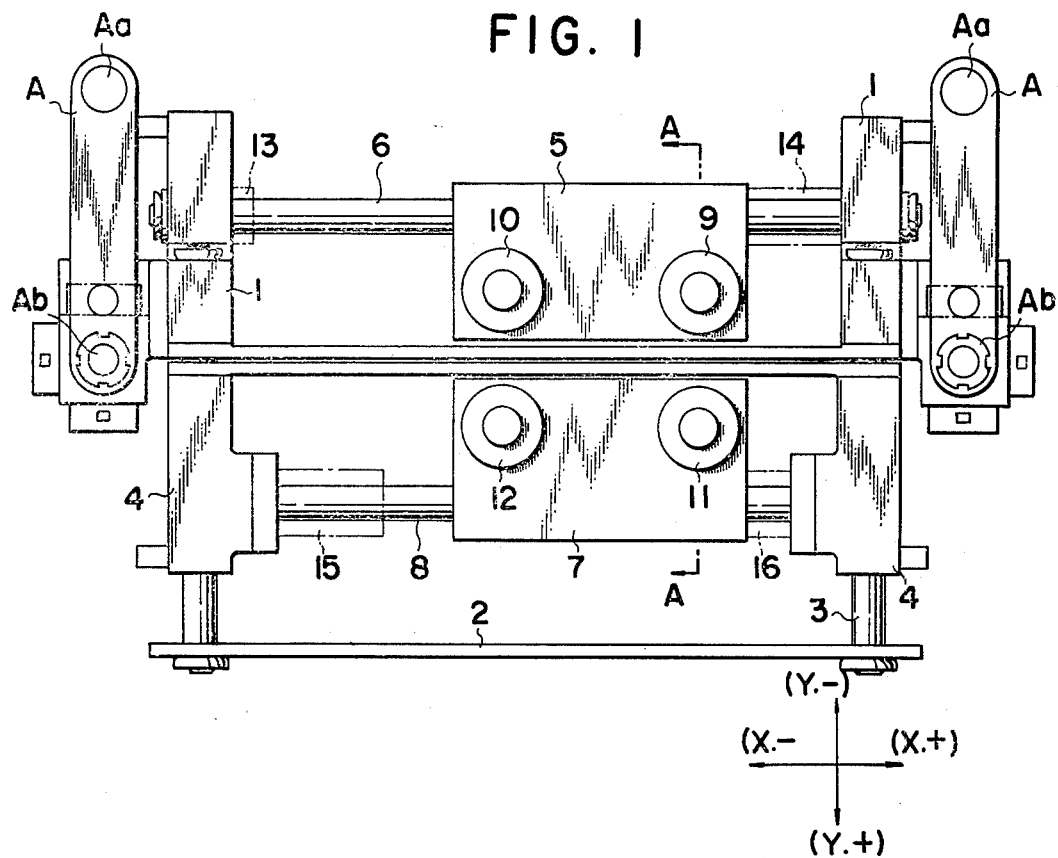
FIG. 1 is a plan view of an apparatus embodying the invention.

Referring now to the drawings, there is illustrated an embodiment of the invention. As shown particularly in FIGS. 1 and 2, symbols (X,Y) and (+,−) with arrows are used to designate the directions in which the apparatus of the invention, generally indicated at I, travels. The apparatus thus can move in four directions, i.e., (X, +), (X,−), (Y,+), and (Y,−) directions.

A frame 1 on the side of the machine in the (Y,−) direction, C-shaped as viewed from above, consists of an inner backing plate 1a and two sideboards 1b, 1c, and has two X-direction guide rods 6, upper and lower, on the open or outer side of the frame. An outer frame 2 located at the end of the (Y,+) side takes the form of a single plate. Four Y-direction guide rods 3 are secured at one ends to the backing plate 1a and at the other ends ot the outer frame 2. These guide rods 3 support a frame 4, which is identical in shape with the frame 1, to be slidable reciprocatingly in the Y-directions. The frame 4 has a backing plate 4a.

In parallel to the two X-direction guide rods 6 of the frame 1 on the side opposite to the backing plate 1a, two similar rods 8 are extended on the side of the frame 4 opposite to the backing plate 4a. These X-direction guide rods 6, 8, respectively, support carrier bodies 5, 7, slidably therealong. The carrier bodies, in turn, have pairs of taps 9, 10, and 11, 12.

Figure 2:
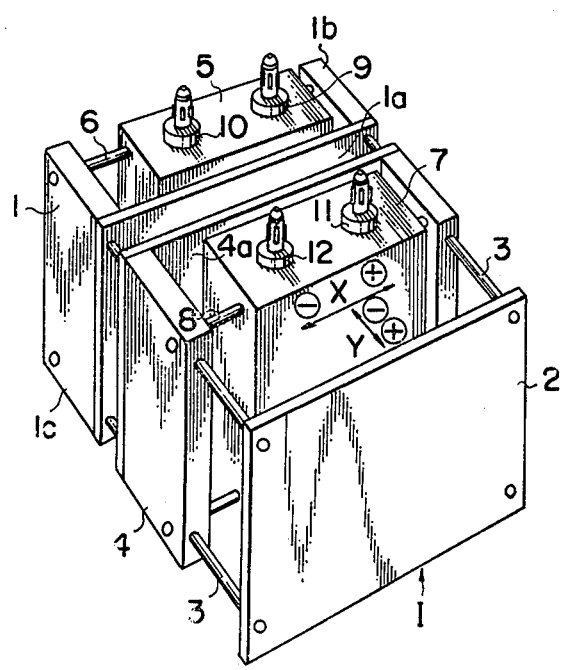
FIG. 2 is a perspective view of the apparatus of the invention, with accessory parts taken away for simplification.

As clearly shown in FIG. 1, the X-direction guide rods 6 have at their both ends (X,−) side stoppers 13 and (X,+) side stoppers 14. Likewise, the X-direction guide rods 8 have at their ends (X,−) side stoppers 15 and (X,+) side stoppers 16. These stoppers 13 to 16 are disposed in such a manner that tap shaft positions are exactly matched with the positions of holes in a ceiling to which the apparatus is to be attached.

The sideboards 1b and 1c of the frame 1 have arms A, one for each. The front end Aa of each arm A is so shaped as to carry an instrument for testing or examining the ceiling holes. Each arm A can rotate in a 180° arc on its rear end in the plane of FIG. 1, thus permitting inspection of all the holes facing the (X,−) and (X,+) sides of the apparatus I.

Next, the construction and action of tap assemblies, the devices essential for securing the apparatus to the ceiling and carrying the weight of the entire apparatus, will be described in detail with reference to FIG. 3, which is a section through A—A of FIG. 1, and FIG. 4, a section through B—B of FIG. 3.

Figure 3:
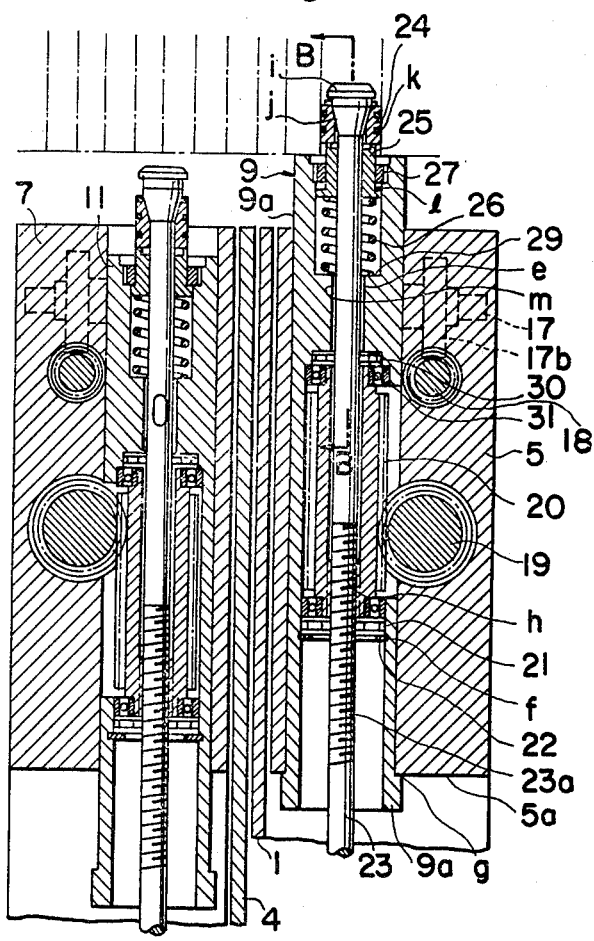
FIG. 3 is a sectional view taken along the line A—A of FIG. 1.
Figure 4:
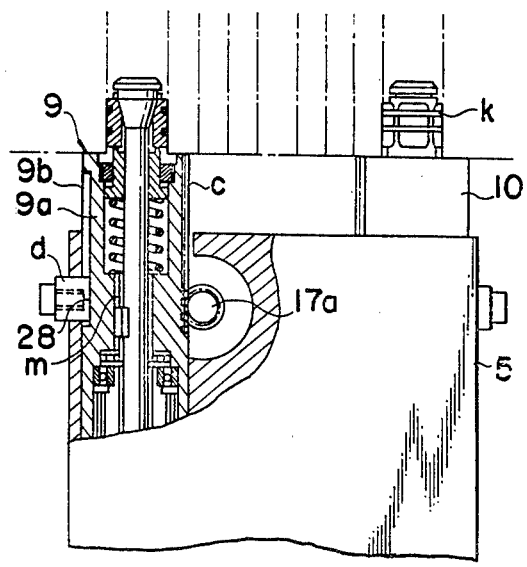
FIG. 4 is a fragmentary view partly in section along the line B—B of FIG. 3. (X,+

As shown in FIG. 4, the upper part of a hollow tap shaft 9a is formed with a rack C for moving the shaft axially upward and downward. On the upper part of the carrier body 5 is provided a detent d for keeping the tap 9 from rotation, with its inner end fitted in a groove 9b of the tap shaft 9a so that the tap shaft is supported to be slidable only in vertical directions relative to the carrier body 5. As shown in FIG. 3, the tap shaft 9a is formed with a neck or constriction e in its bore, with a key way m axially of the constriction. The upper end 29 of the constriction forming a step serves as a seat for a compression spring 26, and the lower end 30 of the constriction as a seat for a bearing 31. At the exposed lower end of the tap shaft 9a is formed an annular step g, which when the tap shaft is raised will come in contact with the underside 5a of the carrier body 5 to serve as a stopper putting a limit to the upward movement of the tap shaft. When the tap 9 is to be secured to the ceiling, the step g functions to carry the weight of the carrier body 5 and hence of the apparatus I.

Reference numeral 17 denotes a double gear consisting of a pinion 17a as the first gear that meshes with the rack of the tap shaft 9a and a worm wheel 17b as the second gear in mesh with a worm 18. The both ends of this double gear are rotatably supported in bearings not shown. The worm 18 meshed with the worm wheel 17b of the double gear 17 is also rotatably supported at both ends in bearings and is connected to a prime mover not shown. The lead angle of the worm wheel, in its engagement with the worm, is smaller than the friction angle, so that the worm can transmit rotational power to the worm wheel but the latter cannot transmit the power to the former.

As shown specifically in the right hand of FIG. 3, a skew gear 19 is provided for the driving mechanism to drive the tap shaft 9a and have the apparatus I clamped to the ceiling. The shaft of this gear is rotatably supported at both ends in bearings not shown and is connected to prime mover means. Another skew gear 20, meshed with the gear 19, is rotatably journaled at both ends in the tap shaft 9a via bearings. The upper end of the skew gear 20 is engaged with the constriction e of the hollow in the tap shaft via a thrust bearing 31, and the lower end of the same gear is supported by a part f of the tap shaft via the seat of a lower thrust bearing 21 and a snap ring 22.

The tap shaft 9a and skew gear 20 are adapted to move together axially upward and downward, with the skew gears 19, 20 sliding relative to each other along their tooth surfaces. The hollow of the skew gear 20 has an internally threaded portion h.

A clamp shaft 23 has a threaded lower portion 23a in thread enegagement with an internally threaded bore h of the skew gear 20. A key 23b is set in the clamp shaft 23 and is fitted in a key way formed in the tap shaft 9a to permit vertical sliding motion of the clamp shaft within the bore of the tap shaft. The upper end i of the clamp shaft has a flat, expanded head with a guide taper for the facility of insertion into a corresponding hole of the ceiling. A neck j under the head is tapered to suit the configuration of collet claws 24.

The clamp shaft 23 is adapted to rotate upward or downward as the skew gear 20 turns with the internally threaded portion h of its hollow in engagement with the externally threaded portion of the shaft.

The collet claws 24, in a cylindrical arrangement with a tapered hollow, are kept in contact with the neck j of the clamp shaft 23. They are separable into four individual claws but are normally held together inwardly by a pair of expansion bands k. A housing 25 for the collet claws is formed with a hole in which the claws are fitted and allowed to slide only in the radial direction, with a restraint in the thrust direction.

A flange l is formed at the lower end of the housing 25, and a compression spring 26 is supported between the underside of the flange and the upper end 29 of the constriction of the tap shaft 9a, so that when the clamp shaft 23 is lowered relative to the tap shaft the compression spring 26 keeps the housing 25 of the collet claws 24 unlowered without any restraint. Also, by dint of the elastic energy of this compression spring 26, the apparatus I can be supported in a stabilized manner by the ceiling through the agency of the tap shaft 9a.

An externally threaded nut 27 is engaged with the internally threaded bore of the tap shaft 9a and is adapted to contact the flange l of the housing 25, thus providing a limit to the upward movement of the housing and allowing the elastic energy of the compression spring 26 to be retained as an internal force of the tap shaft.

The operation of the apparatus I will now be explained. By way of illustration, it is assumed that FIG. 1 shows the apparatus securely attached to the ceiling with the taps 9 to 11 in their uppermost positions and the associated collets inserted into the corresponding holes in the ceiling for the purpose of clamping.

1. If the apparatus in the state shown is to be moved a pitch of holes in the (X,−) direction, the shafts of taps 11, 12 are released from the clamping positions in the ceiling and lowered in the manner to be described in detail later. The amounts of descent are detected by limit switches (not shown) when the upper ends of the taps have slightly come down from the ceiling and, in response to the signals from the limit switches, the taps are stopped and kept from further descent.

Next, the carrier body 7 on the (Y,−) side is moved relative to the frame 4 on that side toward the (X,−) side until it contacts the stopper 15. At this point the taps 11, 12 are opposed to holes both of which are a pitch off in the (X,−) direction from their initially engaged holes in the ceiling. Following this, the taps 11, 12 are raised into the holes and the clamp shafts 23 within the hollow tap shafts are pulled downward to stretch the collet claws 24 for clamping securely inside the ceiling holes. Meanwhile, the apparatus I is kept suspended from the ceiling by means of the other taps 9, 10.

Then, the taps 9, 10 are unclamped and lowered, by the same procedure as used in lowering the taps 11, 12, to the height where they do not interfere with the ceiling if they are moved with their carrier body 5. This is followed by a movement of the apparatus in which the carrier body 7 is left behind, as if traveling relative to the frame 4 in the (X,+) direction. Because the carrier body 7 on the (Y,+) side remains secured to the ceiling by the taps 11, 12, the frame 4 moves toward the (X,−) direction and hence the whole apparatus I excepting the carrier body 7 on the (Y,+) side travels in the (X,−) direction until the carrier body 7 on the (Y,+) side contacts the stopper 16. It follows that the taps 9, 10 are a pitch distant in the (X,−) direction from their initial position in the holes of the ceiling. The clamp shafts within the hollow shafts of the taps 9, 10 are then drawn downward to stretch the collet claws for clamping inside the ceiling holes.

After the procedure above described, the components of the apparatus I reassume their relative positions as shown in FIG. 1. The four taps 9 to 12 are now securely inserted in the holes one pitch apart in the (X,−) direction from the holes in which they originally were. This means that the apparatus I has shifted its position one pitch in the (X,−) direction.

2. When the apparatus is to be moved one pitch in the (X,+) direction, generally the same procedure as described in (1) above is followed. To begin with, the taps 9, 10, are unclamped, and the carrier body 7 on the (X,+) side is moved relative to the frame 4 in the (X,+) direction.

3. When the apparatus is to be shifted three pitches in the (X,−) direction, the taps 9, 10 are first unclamped and then the carrier body 5 on the (Y,−) side is moved relative to the frame 1 in the same manner as in (1). The procedure is repeated the number of times required.

4. When moving the apparatus three pitches in the (X,+) direction, the procedure starts with the unclamping of the taps 11, 12 in the same way as in (1), and the carrier body 5 on the (X,−) side is moved relative to the frame 1 in the (X,+) direction. Then, the procedure is repeated.

5. When moving the apparatus one pitch in the (Y,+) direction, generally the same procedure as described in (1) is followed, first unclamping the taps 11, 12. Next, the carrier body 7 and frame 1 on the (Y,+) side are moved together with respect to the frame 1 and the carrier body 5 on the (Y,−) side toward the outer frame 2 or in the (Y,+) on the (Y,−) side toward the outer frame 2 or in the (Y,+) direction, and the taps 11, 12 are clamped. Following this, the taps 9, 10 are unclamped and the frame 1 is moved close to the frame 4, and finally the taps 9, 10 are clamped. The apparatus has now shifted its position as desired.

6. When moving the apparatus one pitch in the (Y,−) direction, it is only necessary to unclamp the taps 9, 10 in the same manner as in (1), and shift the apparatus as an entirety in the (Y,−) direction while the carrier body 7 and frame 4 on the (Y,+) side remain stuck to the ceiling.

As described in (1) through (6) above, the apparatus I according to the invention can travel by itself, while clinging to the ceiling, by alternately clamping or unclamping the pairs of taps 9, 10 and 11, 12 and shifting their positions by turns in the (X,−), (X,+), (Y,−), or (Y,+) direction. The drives and mechanisms related to the movement of the apparatus I are of types generally in use and therefore the description is omitted.

Now the function of the taps 9 to 12 by which the apparatus I is clingingly supported by the ceiling will be explained. For the illustration purpose it is assumed that these taps are initially in their uppermost positions, with their expansible collet portions for clamping in four holes in the ceiling, thereby making the apparatus I fast to the ceiling.

7. Unclamping and lowering of taps

Turning to FIGS. 3 and 4, the skew gear 19 shown in engagement with the tap shaft 9a is toothed right hand and, when it is turned counter-clockwise, the skew gear 20 will turn counter-clockwise, too, as viewed from above. This forces the clamp shaft 23 upward because of the left hand thread $h$. At this point, the collet claws 24 are stretched out against the surrounding wall of the ceiling hole and also expanded inwardly to fasten themselves on the tapering neck $j$ of the clamp shaft 23. Because the tapering neck $j$ has a greater taper than the inner side of the collet claws 24, a weak upward force applied to the clamp shaft 23 will be sufficient for releasing the neck from the collet claws, leaving a gap between the clamp shaft and the claws. This sets the stretched collet claws free to move radially, and the expansion bands $k$ urge the claws centripetally, reducing their overall diameter and providing a gap between the outside of the claws and the surrounding wall of the ceiling hole. The tap is now in the unclamped state. The upward stroke of the clamp shaft 23 for unclamping is determined in consideration of the relationship between the tap shaft 9a and the clamp shaft 23. Upon full unclamping a limit switch (not shown) is actuated to stop the skew gear 19.

The next step is to turn the right hand worm 18 counter-clockwise, thus turning the double gear 17 counter-clockwise and allowing the tap shaft 9a to fall with the clamp shaft 23 therein under the torque applied to the rack $c$. At the point where the upper end of the clamp shaft 23 has dropped sufficiently below the ceiling, the carrier body 5 and tap 9 on the (Y,−) side assume preset relative positions, where they actuate a limit switch (not shown) to stop the worm 18.

The tap 9 is unclamped and lowered by the aforedescribed procedure.

8. Raising and clamping of taps

In the final stage of the procedure stated in (7) above, the tap shaft 9a is in the lower, unclamped position. Now if the worm 18 is turned clockwise, the double gear 17 turns clockwise, too, causing the tap shaft 9a to move upward together with the clamp shaft 23 within its hollow and other related parts by virtue of the torque exerted on the rack $c$. The tap shaft 9a continues to rise until its annular step $g$ comes into contact with the underside of the carrier body 5 on the (Y,−) side. This is sensed by a limit switch (not shown) from preset relative positions of the tap shaft 9a and the carrier body 5 on the (Y,−) side, and the worm 18 is stopped. In this case the tap 9 is not always in contact with the surface of the ceiling; rather, clearances and deflections of sliding parts in the apparatus I may combinedly form a gap between the tap and the ceiling surface.

Next, the skew gear 19 is turned clockwise with the rotation of the skew gear 20 in the same direction, thus forcing the clamp shaft 23 downward. Since the collet claws 24 are restrained axially by the housing 25, the tapering neck $j$ of the clamp shaft 23 comes in contact with the claws and stretch them outwardly. Consequently, the collet claws 24 are stretched against the surrounding wall of the ceiling hole and, with additional force, the surrounding wall of the hole, collet claws 24, and clamp shaft 23 are securely clamped together. A further effort to lower the clamp shaft then produces a sufficient reaction force to raise the skew gear 20 and therefore the tap shaft 9a and the carrier body 5 on the (Y,−) side until, after all, the upper surface of the tap 9 contacts the surface of the ceiling. During this, the tap shaft 9a and clamp shaft 23 move relative to each other while compressing the compression spring 26. An attempt to lower the clamp shaft further downward will encounter an unusually great force because the tap shaft 9a is already in contact with the ceiling surface. The variation in the torque of the skew gear 19 at this time is detected by a sensor (not shown) and thereby the rotation of the skew gear 19 is stopped. The force with which the tap shaft 9a is lowered during the course of clamping is eventually balanced with the deflective force of the compression spring 26, when the clamping is complete.

Although the construction as well as the operation of the tap shaft 9a has so far been described, it should be obvious that the same applies to the shafts of the other taps 10, 11 and 12.

As will be understood from the foregoing, the apparatus according to the invention can clingingly move in all directions under a ceiling, which is formed with a multiplicity of holes of given dimensions at equal pitches in a regular arrangement (e.g., in latticework or staggered pattern), by alternately clamping, unclamping, raising and lowering pairs of taps 9, 10 and 11, 12 so that the pairs by turns carry the entire weight of the apparatus during the movement. Thus, it is possible to stop the apparatus in any desired position relative to the ceiling and allow it to do the inspection of ceiling holes for flaw detection with the instruments attached to the free ends $Aa$ of the arms A at the both ends of the apparatus.

Even though the apparatus of the invention creeps on the ceiling by alternately raising, lowering, clamping and unclamping the taps, the extensible collets in the ceiling holes provide sufficient clinging force to support the apparatus and bear the reaction force due to the operation of the apparatus. The compression springs, held between the hollow tap shafts and the clamp shafts therein, correct any error which may otherwise stem from plays and deflections of the sliding parts and which may let the apparatus fall from the ceiling. There can be no such error, in accordance with the invention, despite repeated insertion and withdrawal of the taps with respect to the ceiling holes. Therefore, inspection of ceilings and other related work can be automatized through the adoption of suitably combined operation sequences. Although one embodiment of the invention has so far been described as designed for the testing of fine steam pipes of a vertical steam converter, it may be modified to creep on the upright wall of a horizontal steam converter in the same manner as clinging to the ceiling of a vertical converter.

Also, while the invention has been described as applied to an apparatus for automatizing the flaw detection of a steam generator, it may be variously modified without departing from the spirit of the invention, for example, for the inspection of other such holes.

What is claimed is:

1. An apparatus for automatizing flaw detection comprising carrier bodies arranged in parallel on two opposing sides (Y,−) and (Y,+), taps provided on the two carrier bodies to be movable out of and into the upper surfaces of the bodies so as to engage with and disengage from surface holes of an object being tested and thereby support and liberate the carrier bodies relative to the test surfaces, guide rods supporting the carrier body on the (Y,−) side to be slidable in the X-direction, and guide rods supporting the (Y,+) side carrier to be slidable in the Y-direction as well as in the X-direction.

2. An apparatus according to claim 1 wherein each of the taps comprises a tap shaft movable out of and into the associated carrier body, a clamp shaft inserted in the tap shaft to be movable out of and into the same, and means disposed between the upper end portion of the tap shaft and the head of the clamp shaft so that its outside diameter is increased or decreased by the relative movement of the two shafts.

3. An apparatus according to claim 2 wherein the means whose outside diameter is increased or decreased comprises collet claw members having downwardly tapering parts around the head of the clamp shaft and supported by the upper end portion of the tap shaft, with expansion bands fitted around the said means to fasten the claw members together centripetally.

4. An apparatus according to claim 2 wherein the means for effecting the relative movement of the tap shaft and clamp shaft comprises a rack provided on a side of the tap shaft, a drive pinion provided on a side of the carrier body and meshed with the rack, a skew gear turnably disposed within the tap shaft, another skew gear disposed inside the carrier body and meshed with the said skew gear, an internally threaded portion in the bore of one of the skew gears, and an externally threaded portion of the clamp shaft engaged with the said internally threaded portion.

5. An apparatus according to claim 3 wherein a spring is interposed between the tap shaft and collet claw members.

* * * * *